United States Patent [19]

Burnham

[11] 4,295,104

[45] Oct. 13, 1981

[54] LASER HAVING SIMULTANEOUS ULTRAVIOLET AND VISIBLE WAVELENGTHS

[75] Inventor: Ralph L. Burnham, Oxon Hill, Md.

[73] Assignee: The United States of America as represented by the Secretary of the Navy, Washington, D.C.

[21] Appl. No.: 94,125

[22] Filed: Nov. 14, 1979

[51] Int. Cl.³ .................................................. H01S 3/05
[52] U.S. Cl. ............................ 331/94.5 C; 31/94.5 G
[58] Field of Search ...................... 331/94.5 C, 94.5 G, 331/94.5 D; 330/4.3

[56] References Cited

PUBLICATIONS

Measurement of gain on the XeF (C-A) Blue-Green Band, by Hill et al., *App. Phys. Lett.* 34 (2), Jan. 15, 1979.

*Primary Examiner*—William L. Sikes
*Assistant Examiner*—Leon Scott, Jr.

*Attorney, Agent, or Firm*—R. S. Sciascia; William T. Ellis; Melvin L. Crane

[57] ABSTRACT

A method and system for extraction of visible optical energy from gas lasers having simultaneous ultraviolet and visible transitions. In this disclosed method, stimulated emission on the UV transition of rare-gas halide molecules is converted to a wavelength which coincides with the wavelength of the visible transition using a dye laser cell mounted in a common optical cavity with the visible laser. Excitation of the rare-gas halide laser produces high gain UV and low gain visible transitions. The UV is focused into a visible dye cell, and stimulated emission occurs in the dye cell which is contained in an optical cavity also containing the gas laser. The stimulated emission of the dye cell is amplified by the discharge-pumped gas laser medium. Since the gain of the dye laser is very high, the arrangement allows laser emission at the visible wavelength to build-up very rapidly during the gas laser excitation discharge pulse. Laser emission has been produced over a waveguide bandwidth between 460 and 510 nm.

14 Claims, 1 Drawing Figure

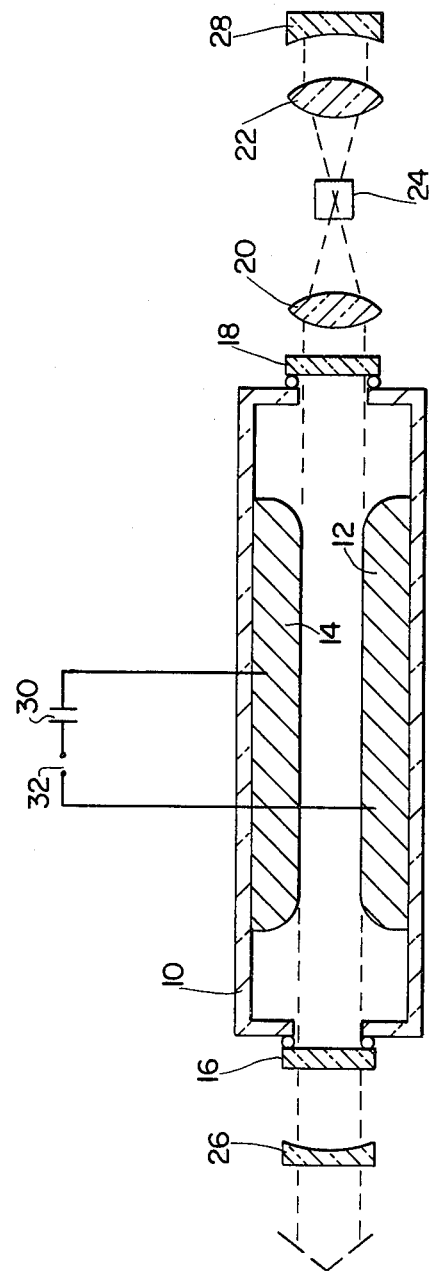

LASER HAVING SIMULTANEOUS ULTRAVIOLET AND VISIBLE WAVELENGTHS

BACKGROUND OF THE INVENTION

This invention relates to rare-gas halide lasers and more particularly to a method for efficient extraction of optical energy from lasers having simultaneous high-gain ultraviolet and low-gain visible wavelengths.

The prospect of obtaining stimulated emission on the C→A transition of XeF has tantalized many laser physicist for several years. The large bandwidth (∼100 nm) and center wavelength at ∼470 nm offer the prospect of a tunable high-power gas laser operating over a large region of the visible spectrum.

Heretofore laser oscillation on the visible transition of XeF has been allowed to build up from spontaneous emission. The laser gain was very low and the laser pulse was relatively short; therefore, stimulated emission on the visible transition did not build up to a sufficient intensity to allow efficient energy extraction in the visible wavelength.

An article, "A Discharge Pumped Laser On The C→A Transition of XeF" by R. Burnham, in *Applied Physics Letters*, Vol. 35, No. 1, pp. 48–49, July 1, 1979 sets forth such a laser.

SUMMARY OF THE INVENTION

This invention combines an electric discharge gas medium laser in combination with a dye laser in the same optical cavity. The UV output of the gaseous laser is used to excite the dye laser in order to increase the gain in the visible region.

BRIEF DESCRIPTION OF THE DRAWING

The single FIGURE is a schematic diagram of the laser system.

DETAILED DESCRIPTION

Referring to the drawing, the single FIGURE is a schematic of a laser system which includes a laser chamber 10 made of any suitable material such as PVC. The laser chamber includes therein transverse electrodes 12 and 14 which extend along the length of the chamber parallel with the principle axis of the chamber and parallel with each other. The opposite ends of the chamber are closed by a mirror 16 which is 100% reflective at about 350 nm and a partially reflecting mirror, 18, approximately 10% at about 350 nm. The mirrors 16 and 18 form a UV laser cavity and are operative to pass visible light. Focusing lens 20 focuses output ultraviolet radiation from laser chamber 10 into a visible dye cell laser 24 positioned on the optical axis of the UV cavity. Lenses 20 and 22 are anti-reflective coated in the visible spectrum. A partially reflective mirror 26 (visible output coupler 30–70% reflecting) is placed outside of mirror 16 on the optical axis of the UV laser cavity and a fully reflective mirror 28 (total reflector in the visible) is placed outside of the focusing lens 22 to form an optical cavity operative in the visible radiation range. The optical cavity formed by mirrors 26 and 28 includes the UV optical cavity and the dye laser.

The laser chamber 10 is filled with a gas mixture comprising from about 0.3% to about 2.0% Xe, from about 0.1% to about of a halogen donor such as 0.3% NF$_3$, and from about 97.7% to about 99.6% He or Ne at a total pressure of from about 1000 Torr to about 2300 Torr.

An electrical discharge source such as capacitors 30 triggered by switch 32 is connected to electrodes 12 and 14 in order to deposit, for example, ten (10) Joules of electrical energy in the UV cavity in a time of about 75 n sec. The laser cell 10 is also provided with means for preionizing the gas prior to the electrical discharge of the main capacitors 30. The electrodes 12 and 14 are about 50 cm in length with their opposing surfaces spaced about 2 cm apart. The laser cell is slightly longer than the electrodes.

Rare-gas halide molecules such as XeF, KrF, and XeCl generally have two low-lying excited states: a transition in the ultraviolet; and a transition in the visible region, from which laser emission can be induced. The transition in the ultraviolet originates on one level which has a much higher gain than that of the transition in the visible region which originates on the other level. In operation of this laser facility, the ultraviolet output from the rare-gas halide laser is used to increase the gain on the visible transition in order to facilitate efficient extraction of the laser energy in the visible region of the spectrum. This is accomplished by the use of a single laser system with a common optical cavity. Stimulated emission on the UV transition of the rare-gas halide is converted to a wavelength which coincides with the wavelength of the visible transition using a dye laser cell mounted in a common optical cavity with the visible laser.

In operation, an appropriate gas mixture comprising, for example, 0.3% Xe, 0.1% NF$_3$ and 99.6% He is added to the laser chamber 10 at a pressure of 1000 to 2300 Torr. The dye laser cell is filled with coumarin 480 dye (or other visible dye). The gaseous mixture is preionized prior to discharge of the main electric power. The main electric discharge excites the gaseous mixture to produce stimulated emission on the UV transition of XeF to obtain oscillation on the B→X transition resulting in a UV output at about 350 nm from the laser cavity formed between mirrors 16 and 18. As set forth above, there is a transition in the visible region which originates simultaneously with the UV output. The UV radiation output is focused into the dye cell by focusing lens 20. The focused UV output induces stimulated emission in the dye cell which is contained within the optical cavity formed by mirrors 26 and 28. The UV transition of XeF is converted to a wavelength which coincides with the wavelength of the visible transition in the excited gaseous medium. The induced stimulated emission of the dye cell is amplified by the electric discharge pumped gas laser medium within the cavity formed by mirrors 26 and 28. Since the gain of the dye laser is very high, the arrangement allows laser emission at the visible wavelength to build up very rapidly during the discharge pulse. Since mirror 26 is partially reflecting in the visible, a visible wavelength bandwidth between 460 and 510 nm will be passed by the mirror 26 as the output of the laser. In this arrangement, laser emission in the ultraviolet is used to increase the gain in the visible range. Also, synchronization between the dye cell oscillator and the discharge pumped gas mixture amplifier is automatic.

The laser device set forth above can be used for any laser system possessing a high-gain UV transition and a low-gain visible transition such as KrF and XeCl. Also other types of high-gain media may be substituted for the dye laser such as a UV-pumped Raman medium-Pb vapor, or a parametric converter-ADP, KDP. Other excitation means, such as e-beam, or optical pumping, may be used for exciting the gaseous medium laser.

It has been determined that a rare-gas halide laser in a cavity with a visible dye laser produces a laser output in the visible spectrum with an improvement factor of 100 over that of a rare-gas halide laser alone. Laser output in the visible with the laser of this invention was increased from $3 \times 10^{-3}$ Joules.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A laser system operative in the visible region of the spectrum which comprises:
   a first and second laser having a common optical cavity;
   said first laser including a medium which possesses a high-gain UV transition and a low-gain visible transition disposed within a resonant second optical cavity;
   said second laser including a high gain medium which is stimulated by UV radiation; and
   said first laser further including means for extracting and directing the ultraviolet radiation from said second optical cavity into the high gain medium of said second laser;
   whereby the stimulated emission of said second laser is amplified by the low-gain visible transition of said first laser to produce laser emission in the visible region of the spectrum in the common optical cavity.

2. A laser system as claimed in claim 1 wherein:
   said first laser includes a gaseous mixture including a source of rare-gas and a halogen donor as its medium.

3. A laser system as claimed in claim 2 wherein:
   said gaseous mixture in said first laser comprises He, Xe, and $NF_3$.

4. A laser system as claimed in claim 3 wherein:
   said second laser is a visible dye laser.

5. A laser system as claimed in claim 2 wherein:
   said second laser is a visible-dye laser.

6. A laser system as claimed in claim 2 in which
   said source of rare gas and halogen donor is selected from the group consisting of XeF, KrF, and XeCl.

7. A laser system as claimed in claim 2 which includes:
   means for exciting said first laser.

8. A laser as claimed in claim 2 wherein:
   said gaseous mixture in said first laser comprises from about 0.1% to about 0.3% of $NF_3$, from about 0.3% to about 2.0% of Xe, and from about 97.7% to about 99.6% HeAlNe at from about 1000 to about 2300 Torr total pressure.

9. A laser system as claimed in claim 2 wherein:
   said gaseous mixture in said first laser comprises about 0.1% $NF_3$ at a pressure of 1 Torr pressure, about 0.3% Xe at a pressure of 3 Torr and about 99.6% He at a pressure of 2300 Torr.

10. A laser system as claimed in claim 9 wherein:
    said second laser is a visible dye laser.

11. A laser system as claimed in claim 10 wherein:
    the dye in said dye laser is coumarin 480.

12. A laser system as claimed in claim 1 wherein:
    said second laser is a visible dye laser.

13. A laser system as claimed in claim 12 wherein:
    the dye in said dye laser is coumarin 480.

14. A method of operating a rare-gas halide laser with an output emission in the visible region of the spectrum comprising:
    placing a rare-gas halide laser-cavity and a visible-dye laser within a common resonant laser cavity operative in the visible,
    exciting said rare-gas halide laser to produce a high-gain UV transition and a low-gain visible spectral region transition,
    extracting UV radiation from said rare-gas halide laser cavity and focusing said extracted UV radiation onto said dye laser to induce stimulated emission in said visible-dye cell,
    whereby the stimulated emission produced by the visible dye laser is contained within the common laser cavity and amplified by the low-gain visible transition of the rare-gas halide laser to produce a laser output emission in the visible range of the spectrum from the common laser cavity.

* * * * *